US006239530B1

United States Patent
Garcia

(10) Patent No.: US 6,239,530 B1
(45) Date of Patent: May 29, 2001

(54) SUBSYNCHRONOUS RELUCTANCE ELECTRICAL MACHINE

(75) Inventor: Fernando Garcia, Barueri (BR)

(73) Assignee: Elevadores Atlas-Schindler S/A (BR)

( * ) Notice: Subject to any disclaimer, the term of this patent is extended or adjusted under 35 U.S.C. 154(b) by 0 days.

(21) Appl. No.: 09/408,298

(22) Filed: Sep. 29, 1999

(30) Foreign Application Priority Data

Oct. 16, 1998 (BR) .................................................. 003538

(51) Int. Cl.[7] .......................... H02K 1/00; H02K 41/00; H02K 19/00; H02K 1/12
(52) U.S. Cl. ......................... 310/216; 310/187; 310/259; 310/162; 310/12
(58) Field of Search ........................ 310/216, 217, 310/187, 254, 258, 259, 162, 168, 68 B, 49 R, 12, 13, 14

(56) References Cited

U.S. PATENT DOCUMENTS

| 4,288,709 | * | 9/1981 | Matthias et al. | 310/49 R |
|---|---|---|---|---|
| 4,315,171 | * | 2/1982 | Schaeffer | 310/49 R |
| 4,475,051 | * | 10/1984 | Chai et al. | 310/49 |
| 4,713,570 | * | 12/1987 | Mastromattei | 310/154 |
| 4,733,117 | * | 3/1988 | Perrins | 310/162 |
| 4,990,809 | * | 2/1991 | Artus et al. | 310/192 |
| 5,173,651 | * | 12/1992 | Buckley et al. | 318/701 |
| 5,283,486 | * | 2/1994 | Kobori | 310/49 R |
| 6,025,668 | * | 2/2000 | Kolomeitsev | 310/187 |
| 6,051,898 | * | 4/2000 | Sakamoto | 310/49 R |

* cited by examiner

Primary Examiner—Nestor Ramirez
Assistant Examiner—Dang Dinh Le
(74) Attorney, Agent, or Firm—D. Peter Hochberg; Katherine R. Vieyra; William H. Holt

(57) ABSTRACT

A sub-synchronous reluctance electrical machine having a stator provided with a core comprised of an assembly of magnetically uncoupled or weakly coupled sectors of ferromagnetic plates having longitudinal teeth arranged on the face thereof turned towards the rotor and provided with grooves to respectively house a winding. This winding is comprised of a plurality of coils surrounding a respective sector of the ferromagnetic material of stator in a properly distributed manner, so as to generate a magnetic field whenever this winding is energized. The sub-synchronous reluctance electrical machine possesses as an integral part thereof said rotor which in turn is provided with a core of magnetic plates having longitudinal teeth uniformly arranged along the face thereof turned towards the stator, said teeth being in a number different from the number of teeth of the stator. The machine is further provided with a monitoring device, for relative identification of the teeth of the rotor and the stator, in order to allow achievement of a maximum torque.

8 Claims, 11 Drawing Sheets

SUBSYNCHRONOUS RELUCTANCE ELECTRICAL MACHINE

BACKGROUND OF THE INVENTION

1. Field of the Invention

The present invention relates to a new reluctance electric machine and, more particularly, to a rotating or linear sub synchronous reluctance machine. As is known by those of skill in the art, one of the best known and most employed types of reluctance electrical machines is the switched reluctance motor, which presents, as a limiting aspect to the use thereof, the existence of torque and speed oscillations, as well as the difficulty of imposing high variation rates in the electric current. Other drawbacks of this switched reluctance motor relates to the fact that the circuits employed for controlling and feeding them are very complex and expensive, specially in respect of high-power machines.

2. Description of the Prior Art

As an alternative to solve the above mentioned drawbacks, the patent Brazilian application PI9400880-9, published on Dec. 24, 1995 and relating to "Reluctance electrical machine" has been proposed, which provided an electrical machine comprised of a rotor and a stator. Said stator was provided with a core comprised of magnetic plates and provided with longitudinal teeth projecting towards the rotor. Said stator also comprised a plurality of grooves capable of receiving a multi-phase winding, said winding being comprised of a plurality of coils homogeneously surrounding the stator's magnetic material. As a supplementation, said rotor was formed by a core of magnetic plates provided with longitudinal teeth projecting towards the stator. Thus, upon energizing of said coils by a balanced multiphase voltage, a rotating field was generated, which caused a relative movement between rotor and stator.

However, and even though such machine was capable of overcoming the drawbacks of the prior art, there is still the fact that the electrical machine described on in Brazilian patent application PI 9400880-9 has the particular drawback of a low power factor, and in some cases may increase the cost of the drive system.

SUMMARY OF THE INVENTION

It is an object of the present invention to provide a reluctance electrical machine providing high torque at low speeds, advantageously replacing the switched reluctance, conventional electrical machines.

It is an object of the present invention to provide a reluctance electrical machine presenting high torques at low speeds, advantageously replacing in terms of cost and maintenance the conventional mechanical reduction machines that multiply the torque and decrease the speed.

It is an object of the present invention to provide a reluctance electrical machine that allows a large control of the rotation and torque thereof, without the need of a complex and expensive power and control circuit.

Another object of the present invention is to provide a reluctance electrical machine that, by reason of its constructive features, does not present oscillations in the resulting torque and speed.

Another object of the present invention is to provide an improvement on the reluctance electrical machine as per the above described Brazilian patent application PI 9400880-9, having characteristics of a high power factor.

These and other objects and advantages of the present invention are achieved by a sub-synchronous reluctance electrical machine comprised of a stator provided with a core composed of magnetically uncoupled or weakly coupled sectors of ferromagnetic plates having longitudinal teeth arranged on the face thereof facing the rotor and provided with grooves to house a winding, the latter being comprised of a plurality of coils surrounding the ferromagnetic material, thereby creating a magnetic field when the winding thus defined is energized.

Said rotor is an integral part of the machine and is in turn provided with a core comprised of ferromagnetic plates having longitudinal teeth arranged uniformly along its face turned towards the stator. In addition, the number of teeth on the rotor is necessarily different from the number of teeth on the stator.

The machine is further provided with a device for monitoring and identifying the relative position between the stator and rotor teeth in order to allow the identification of the region of largest magnetic permeability between the rotor and the stator, in order to allow the proper feeding of the stator coils, thereby obtaining the maximum possible torque.

The present invention has constructive characteristics similar to those of the machine described in Brazilian patent application PI9400880-9, however it is fundamentally different therefrom in the following items:

The stator core is comprised of magnetically uncoupled or weakly coupled sectors, contrary to the machine described on the Brazilian patent application PI9400880-9, which employs integral magnetic plates; and The coils are individually fed with currents controlled and monitored by devices identifying the relative position between the stator and rotor teeth, whereas in the Brazilian patent application PI9400880-9 the coils are multiphase and are energized by balanced multiphase voltages.

These differences allow the machine subject matter of the present invention to possess a high power factor, which means that during the operation thereof the machine absorbs low currents.

Accordingly, it is an object of the present invention to provide a sub-synchronous reluctance electrical machine of the type comprising at least one rotor formed of ferromagnetic plates and provided with a plurality of uniformly distributed teeth and at least a stator provided on the surface thereof facing said rotor with a second plurality of teeth, also uniformly arranged, plus windings, said windings being selectively fed by a current power source, and the at least one stator is formed by a series of magnetically uncoupled or weakly coupled sectors of ferromagnetic plates, each sector comprising at least one winding, the at least one winding of each sector having the power thereof controlled by a monitoring device, and the number of teeth on the stator being different from the number of teeth on the rotor.

BRIEF DESCRIPTION OF THE DRAWINGS

The scope of the present invention will be best understood in the light of the following description, made with reference to the appended drawings, shown for illustrative purposes only and not as limitation of the scope of the invention, wherein.

DESCRIPTION OF THE PREFERRED EMBODIMENT

Figure 1:
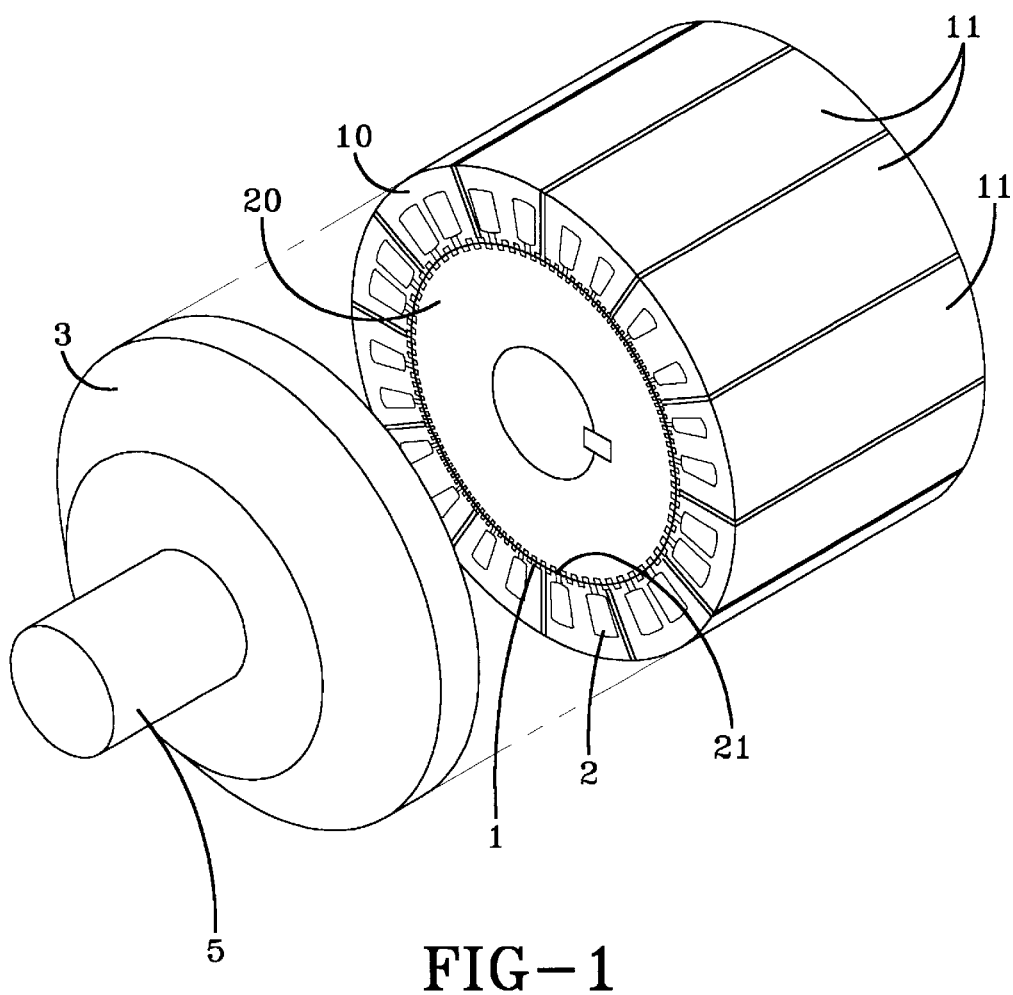
FIG. 1 is a perspective view in partial section of a sub-synchronous reluctance rotating motor made according to the inventive concept defined for the sub-synchronous electrical machine with one winding on the stator, said stator being external to the rotor.

In accordance with the above figures, the reluctance electrical machine of the present invention is conceptually defined by a stator 10 provided with a core comprised of magnetically uncoupled or weakly coupled ferromagnetic plate sectors 11 having longitudinal teeth 1 arranged on the face thereof turned towards the rotor 20 and provided with grooves 2 for housing one or more windings 6.

Figure 2:
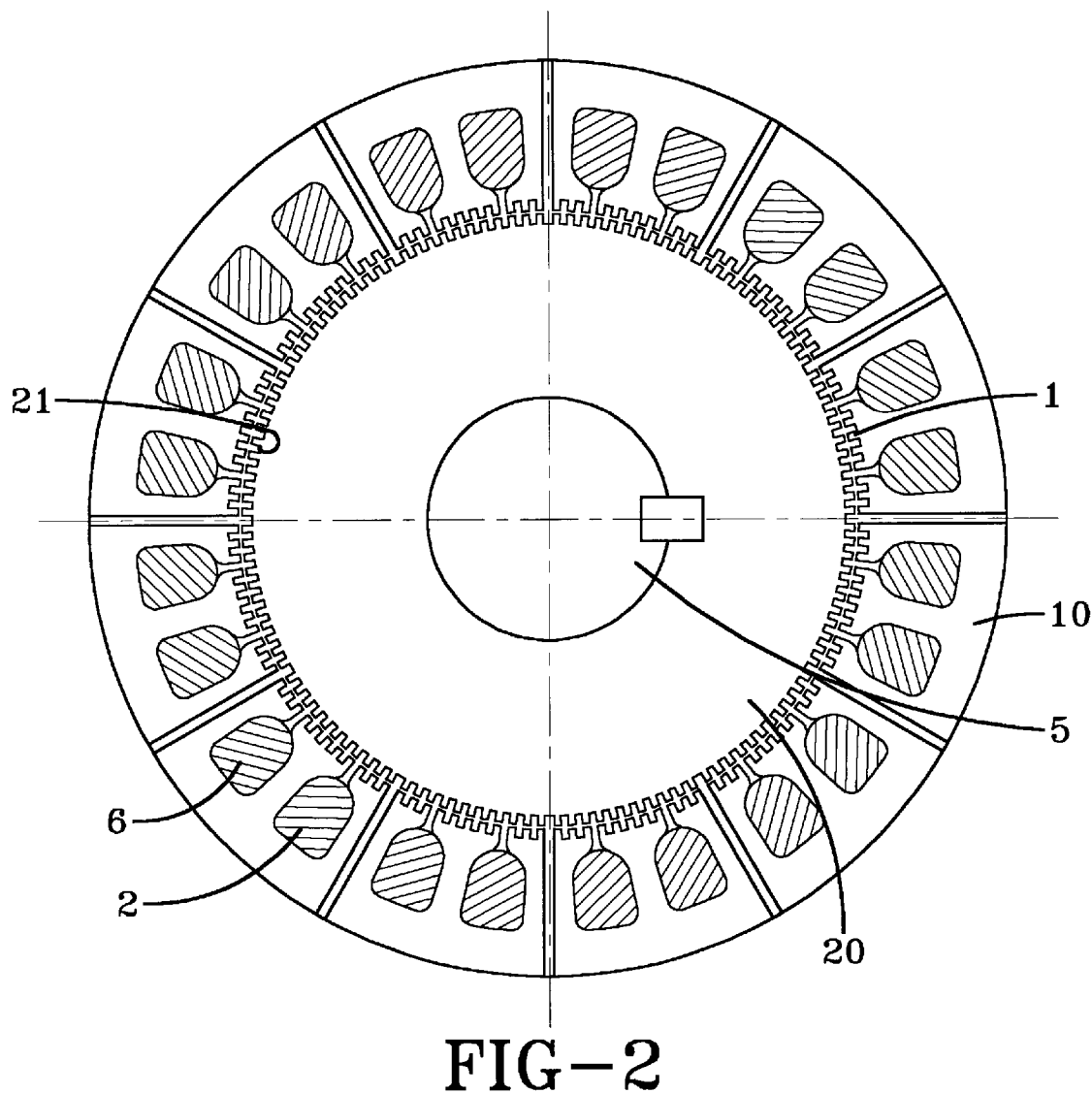
FIG. 2 is a section view of the motor shown on FIG. 1.
Figure 2A:
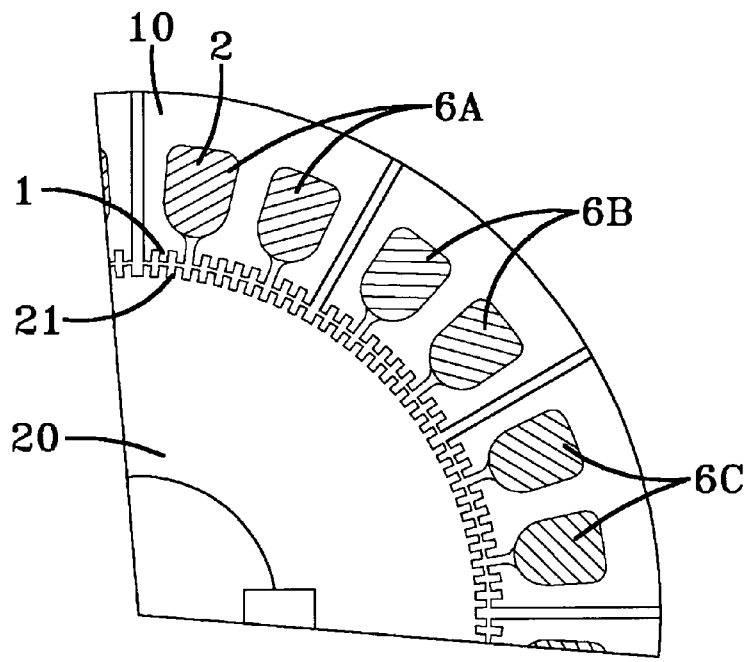
FIG. 2a is an enlarged detailed view of the section of the motor on FIG. 2.
Figure 2B:
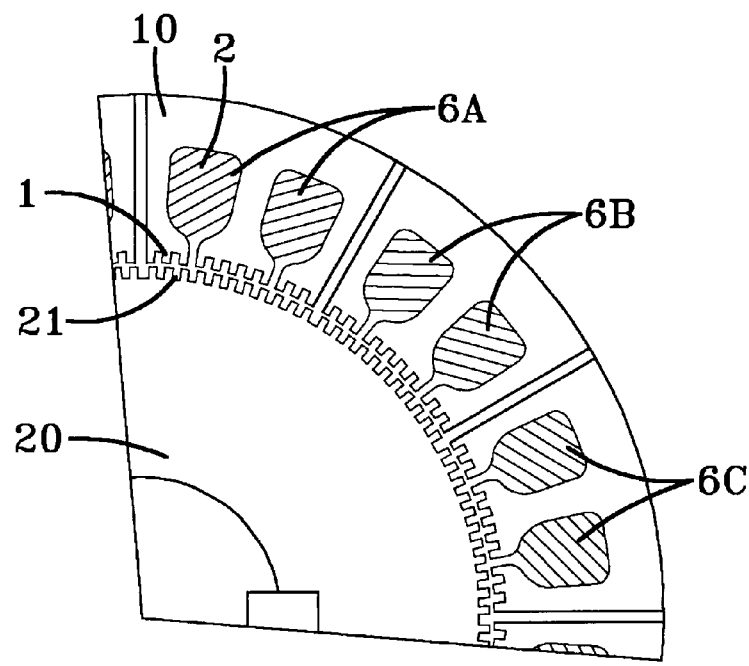
FIG. 2b is a view similar to FIG. 2a, but with the rotor displaced ⅙th from the pitch of the stator teeth.

These windings 6 are comprised of a plurality of coils surrounding the magnetic material of stator 10, in order to generate a magnetic field whenever this winding is energized. As an integral part of the sub-synchronous reluctance electrical machine is said rotor 20 which is in turn provided with a core of ferromagnetic plates having longitudinal teeth 21 uniformly arranged along the face thereof turned towards the stator 10, said teeth 21 being in a number different from the number of teeth 1 of stator 10. More specifically, FIGS. 1–2 shown a sub-synchronous rotating motor the shell of which fixedly houses a stator 10 within which is arranged a rotor 20 supported by shaft 5.

As shown, the stator 10 is formed by a plurality of magnetically uncoupled or weakly coupled sectors 11, and is formed of ferromagnetic plates, the surface facing the rotor 20 being provided with a plurality of teeth 1. In addition, said stator is provided with a series of grooves 2 within which are arranged the windings 6.

In a supplementary manner, rotor 20, formed of ferromagnetic plates, is provided with a plurality of teeth 21 on the surface thereof facing the stator 10, the number of teeth 21 of rotor 20 being different from the number of teeth 1 of stator 10.

Figure 3:
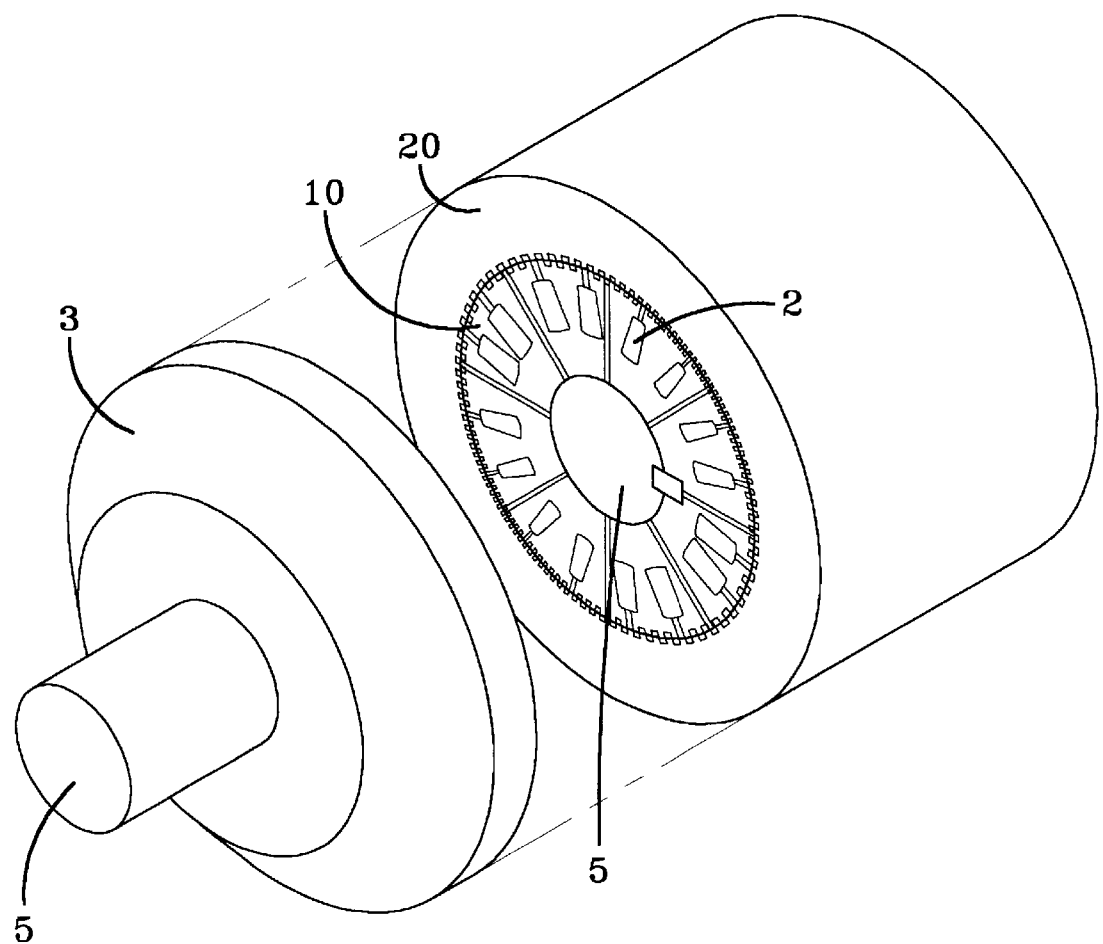
FIG. 3 is a perspective view in partial section of a sub-synchronous reluctance rotating motor identical to the one shown on FIG. 1, but with the stator internal to the rotor.
Figure 4:
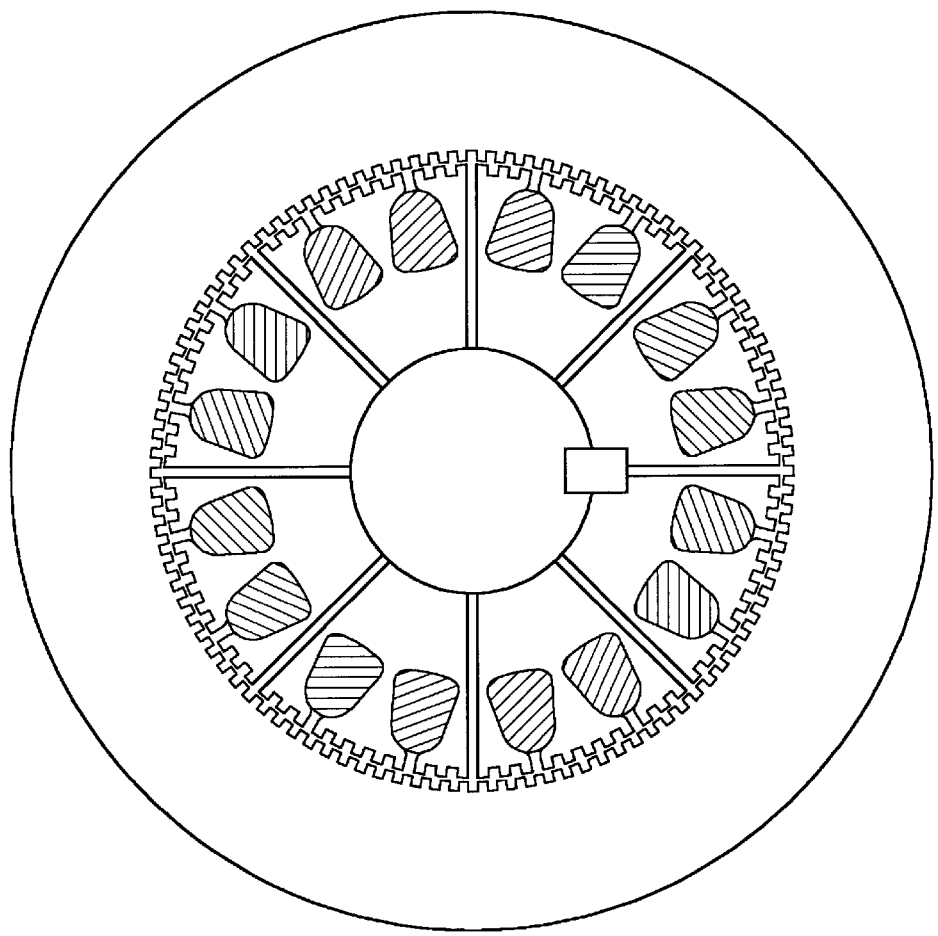
FIG. 4 is a section view of the motor shown on FIG. 3.
Figure 4A:
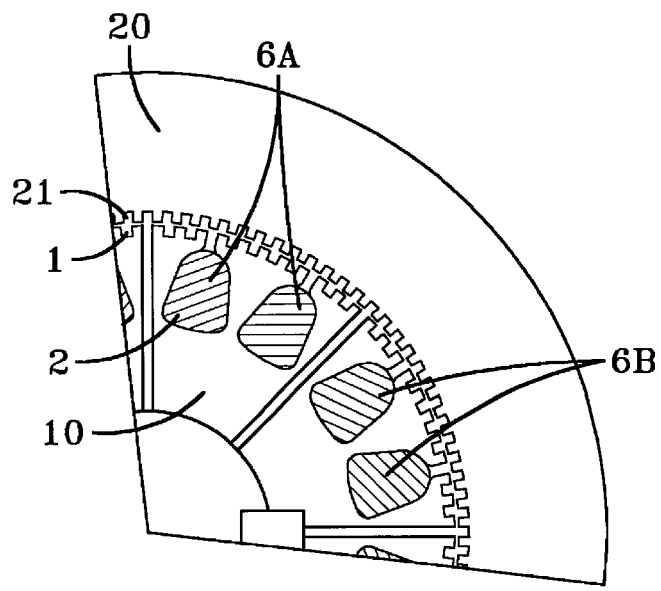
FIG. 4a is an enlarged detailed view of the section of the motor of FIG. 4.

FIGS. 3–4 illustrate a motor similar to the one described above, differing therefrom only in that the stator 10 is internal and supported by shaft 5, whereas the rotor 20 is attached to the motor shell 3.

Figure 5:
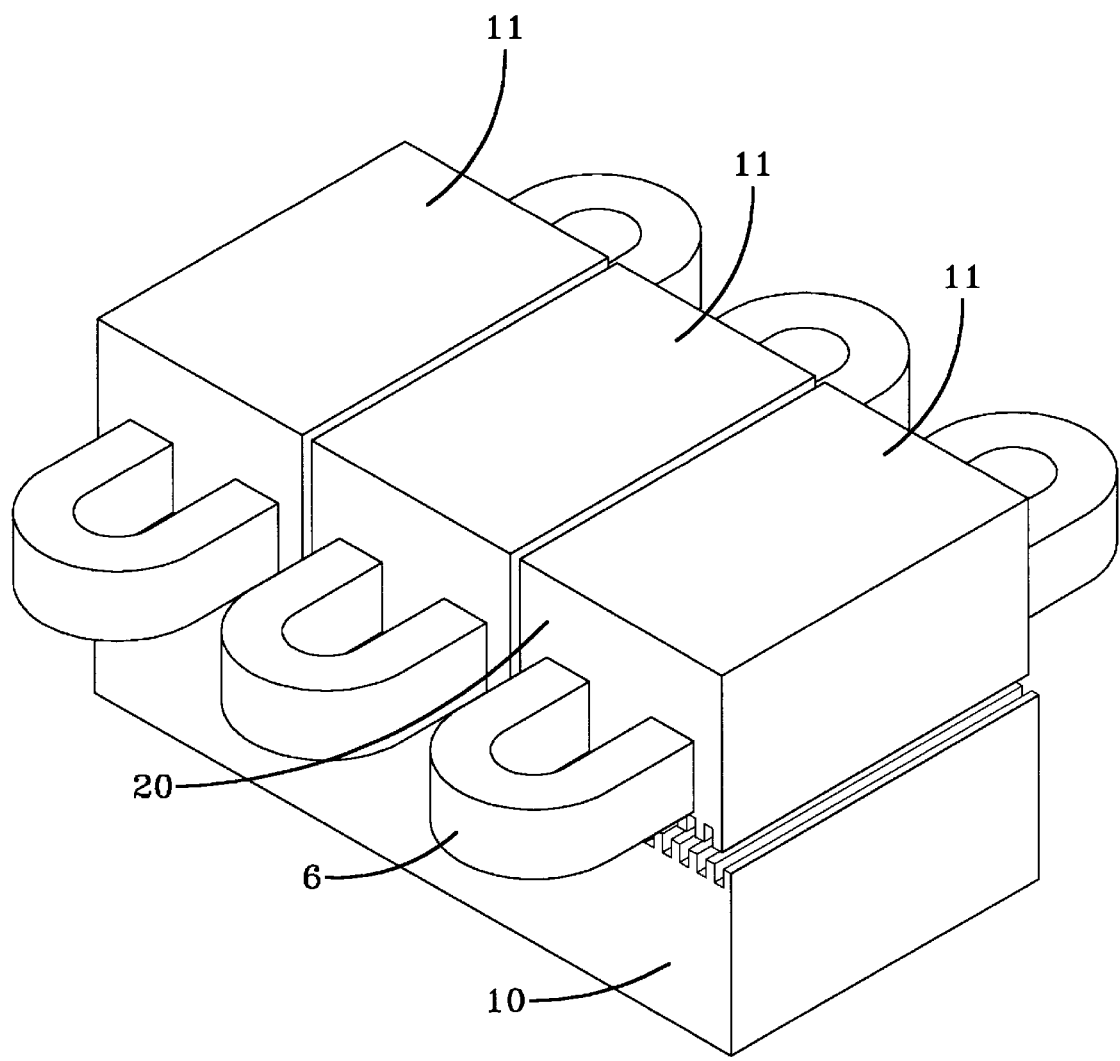
FIG. 5 is a schematic, perspective representation of a sub-synchronous reluctance linear motor made according to the inventive concept defined for the sub-synchronous reluctance electrical machine.
Figure 6:
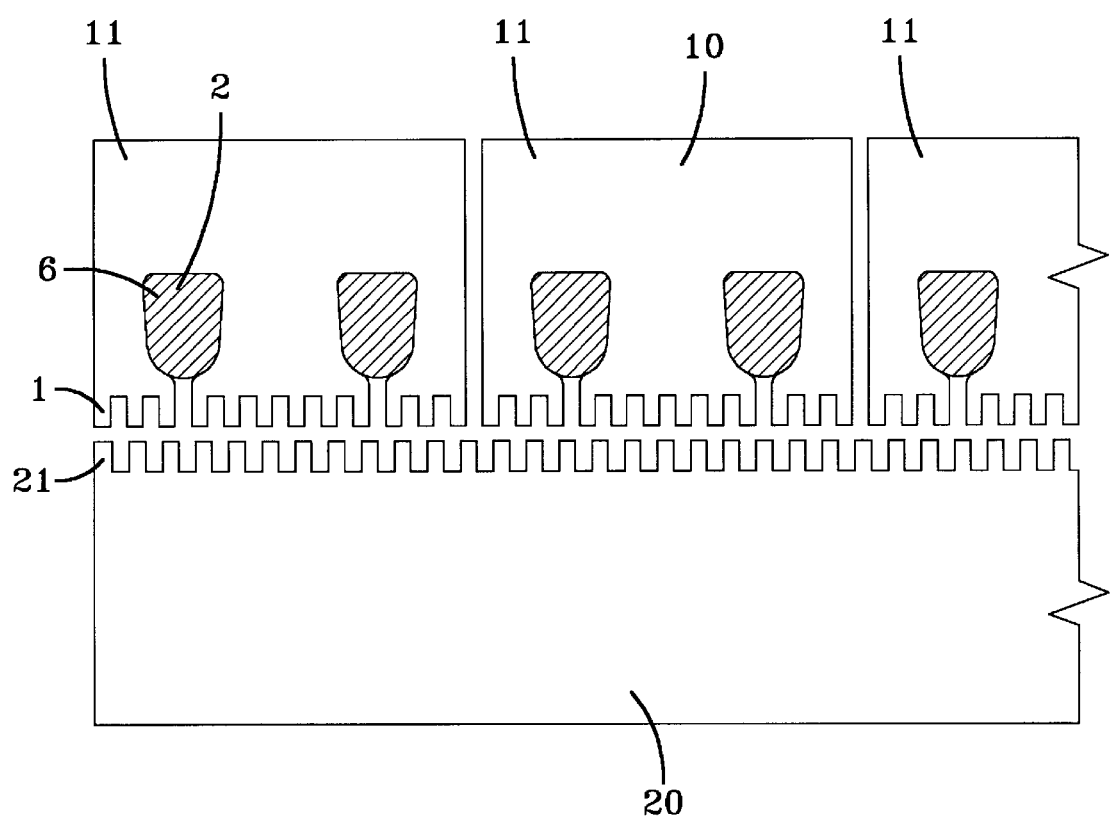
FIG. 6 is a longitudinal section view of the motor shown on FIG. 5.

FIGS. 5–6 illustrate in a very schematic manner a linear motor wherein the stator 10 and the rotor 20 face each other by means of respective teeth 1 and 21. The stator 10 in accordance with the invention is formed o uncoupled or weakly coupled sectors, and the windings 6 are housed within each sector.

Figure 7:
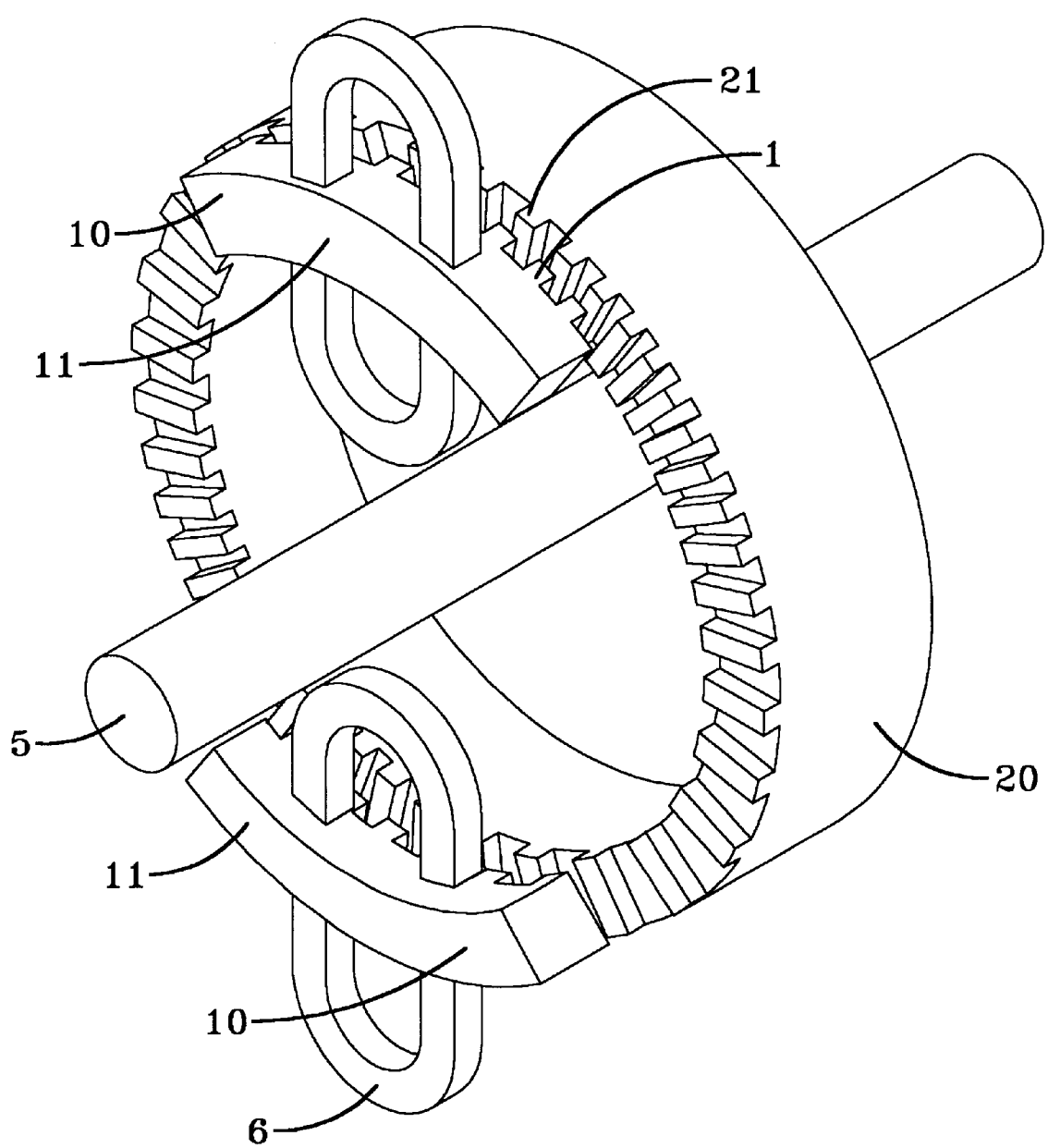
FIG. 7 is a perspective view of a sub-synchronous reluctance disc motor made according to the inventive concept defined for the sub-synchronous reluctance electrical machine.
Figure 8:
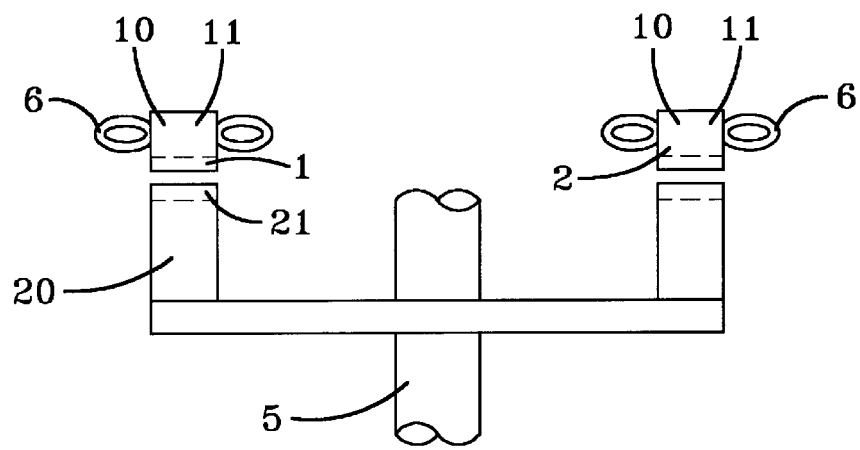
FIG. 8 is a cross-section view of the motor on FIG. 7.

FIGS. 7–8 in turn illustrate also in a schematic manner a sub-synchronous disc motor, wherein rotor 20 is attached to the motor shaft 5 and faces the stator 10 by means of the respective teeth 21 and 1. The stator 10 is formed of a plurality of uncoupled sectors 11, in this case illustrated by only two sectors 11, each provided with grooves to receive the windings 6. Said windings are maintained within each of the sectors 11 of stator 10, specifically inside the respective grooves 2.

Figure 9:
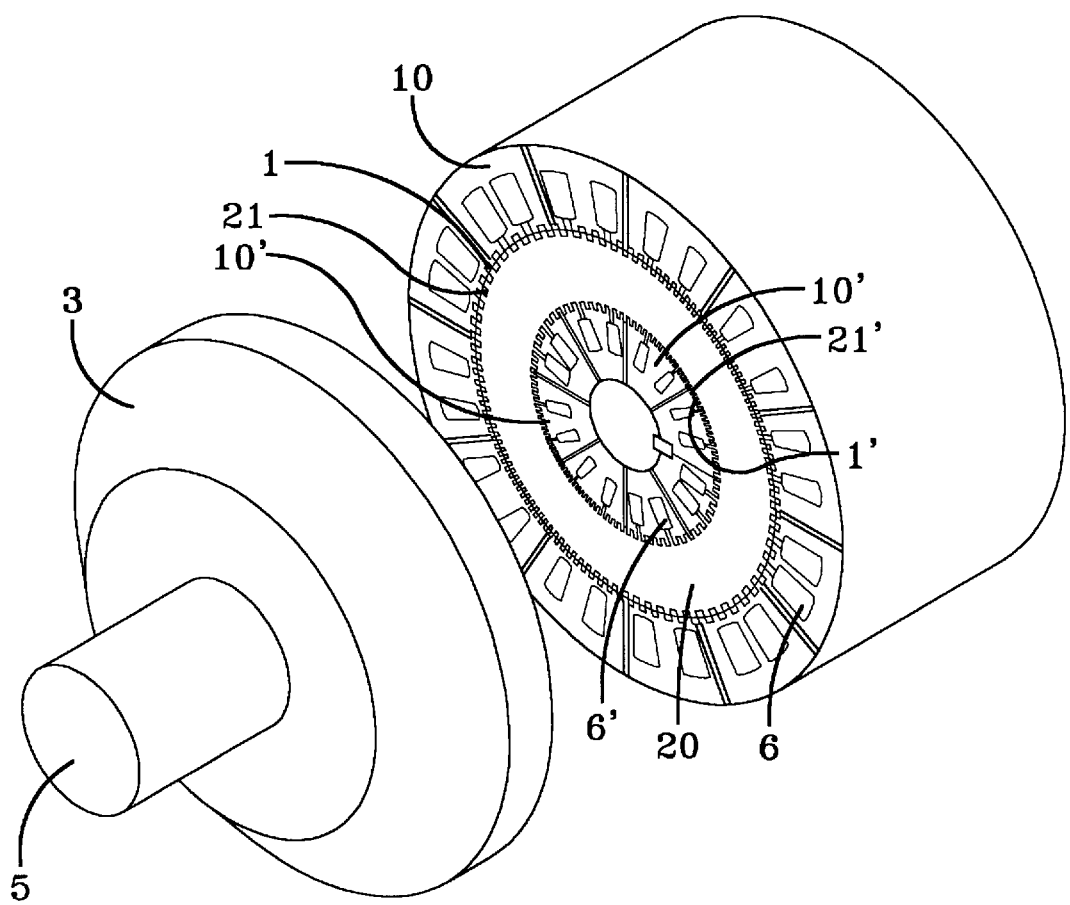
FIG. 9 is a perspective, partial section view of a motor with two stators and two (inner and outer) sub-synchronous reluctance windings made according to the inventive concept defined for the sub-synchronous electrical machine.

Finally, FIG. 9 illustrate a sub-synchronous reluctance motor of two stators 10, 10' and two windings 6, 6', made in accordance with the characteristics of the present invention. More particularly, said motor is formed of a first, external stator 10 attached to shell 3, which surrounds a rotor 20 attached to shaft 5, in a known manner. Said stator 10 is provided with a series of internal teeth 1 which face a series of external teeth 21 of rotor 20. Said rotor 20 is provided internally thereof with a second series of teeth 21' which face a series of teeth 1' of the second stator 10'. In this case, the stators 10, 10' are fixed and have the respective sectors 11, 11' cooperating in an angular position, as are cooperating the respective windings 6, 6'.

Figure 10:
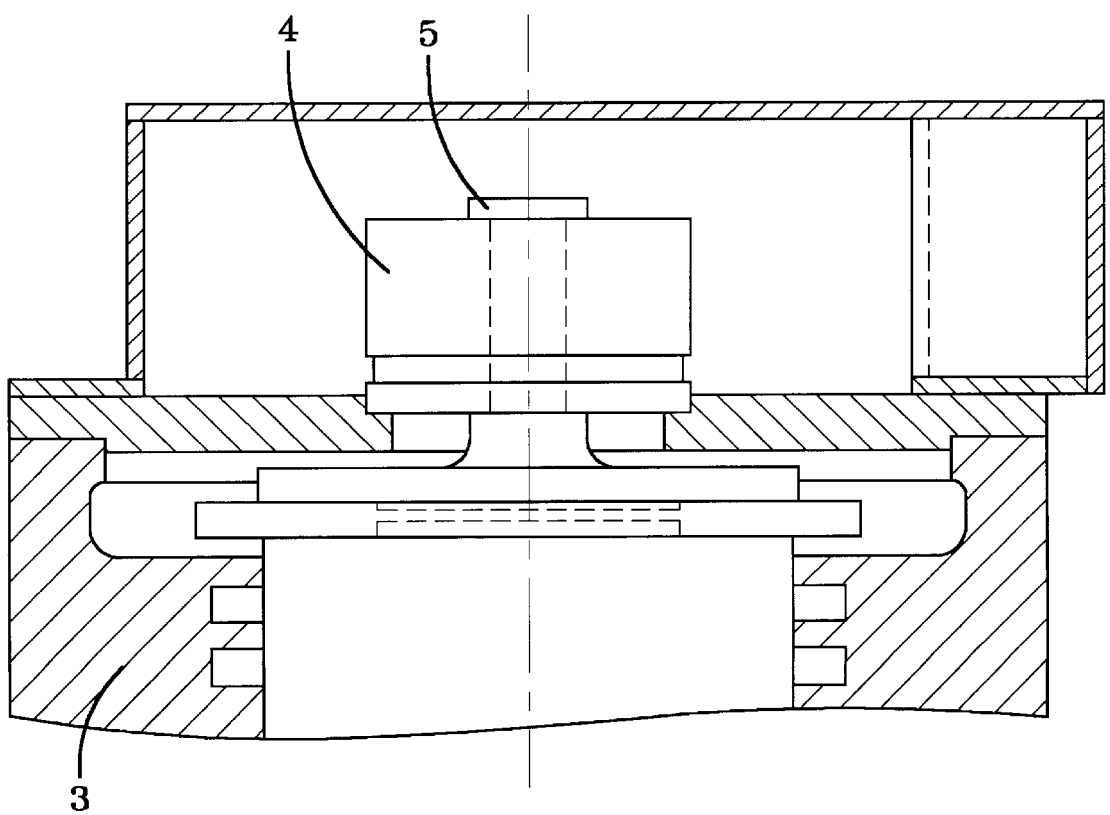
FIG. 10 is an elevation view of the shaft end of any of the motors illustrated above, to which is coupled a device for monitoring and identifying the relative position between the rotor and stator teeth.

The machine is further provided with a monitoring device 4 for relative identification of the teeth of rotor 20 and the teeth of stator 10, as shown on FIG. 10. Such device, of a known type, can be for example a resolver or an encoder, and is capable of determining the relative position between the teeth 1 of stator 10 and teeth 21 of rotor 20. Alternatively, this monitoring device 4 can be comprised, for example, of a position detector based on Hall effect, properly attached to the stator.

Figure 11:
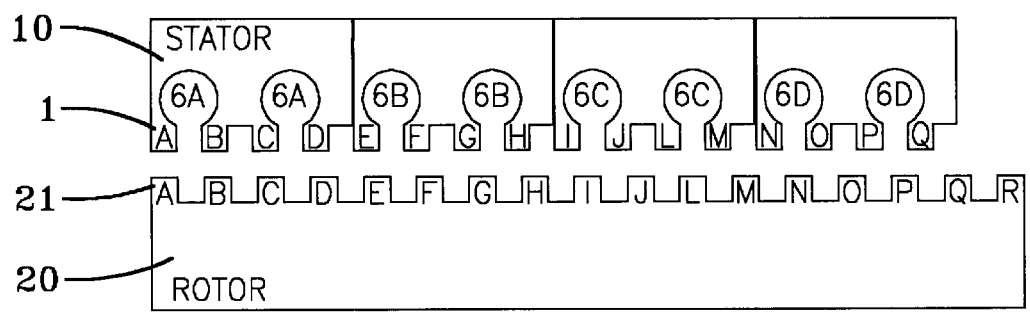
FIGS. 11–11c illustrate in a schematic manner the movement of a linear motor of the type shown on FIG. 5.
Figure 11A:
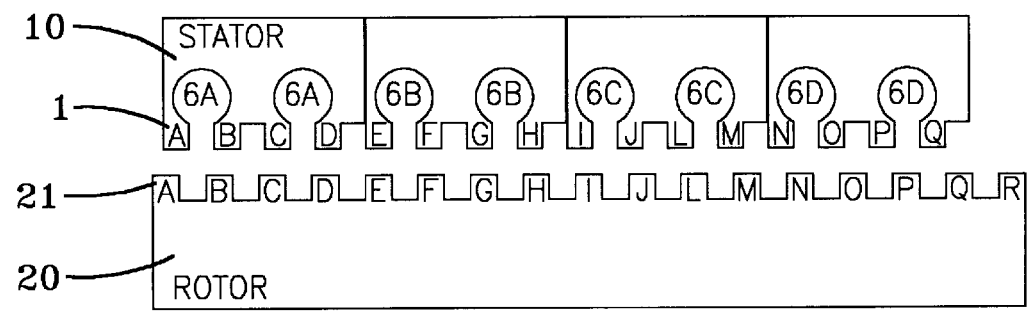
Figure 11B:
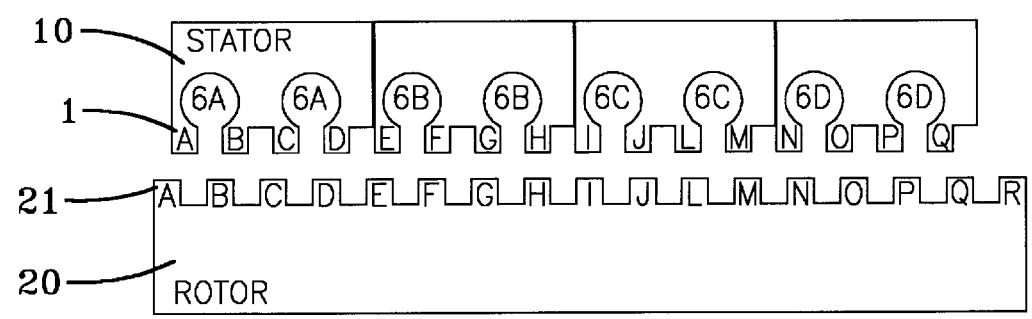
Figure 11C:
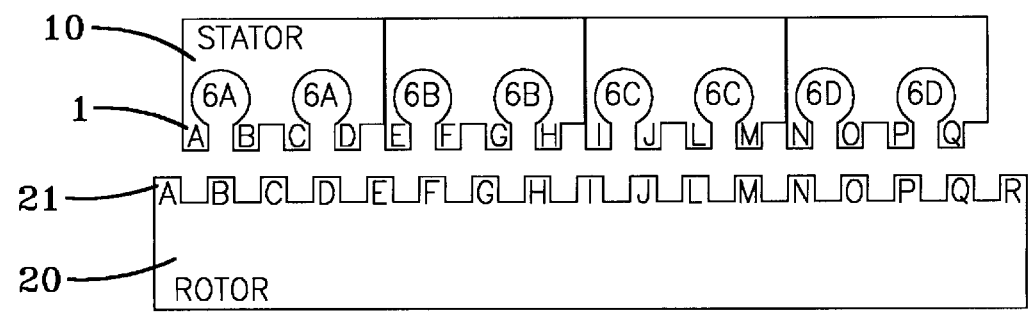

For a better understanding of the inventive concept now claimed, the operation of the sub-synchronous reluctance electrical machine will be described in a more detailed manner, taking as reference the linear sub-synchronous motor shown on FIG. 5. By means of the monitoring device 4 for identification of the relative position of teeth 1 of stator 10 and teeth 21 of rotor 20, the condition indicated on FIG. 11 (teeth 1a and 21a aligned) is identified and the coils 6a and 6b are energized, that is, the magnetic field is always maintained at 90° magnetic degrees from the region of highest permeability, thereby causing a displacement of teeth 21 of rotor 20, until they reach an equilibrium position shown on FIG. 11a. In this condition, wherein the stator teeth 1e can be seen in alignment with rotor teeth 21e, the coil 6a is de-energized and the subsequent coil 6c is energized, jointly with coil 6b, thereby causing a new displacement of rotor teeth 21 towards the position shown on FIG. 11b. In the same sequence, coil 6b is de-energized, and coils 6c and 6d are energized, thereby obtaining a displacement of rotor 20 towards the position shown on FIG. 11c, where teeth 1n is seen aligned with teeth 21n, and so on and so forth.

Accordingly, by successively repeating in a controlled manner the operation of energizing and de-energizing the coils, a controlled movement of rotor 20 is obtained. As shown on FIG. 11, when the windings 6a and 6b of stator 10 are energized, the region of highest permeability between stator 10 and rotor 20 tends to stay in alignment with the field, so that the latter drags with it said region of highest permeability, thereby causing the relative displacement between rotor 20 and stator 10.

While the winding is successively energized and de-energized, the sequence of movements between rotor 20 and stator 10 takes place, so that, upon completion of 360 electrical degrees of field displacement, the rotor 20 will have traversed only two teeth of stator 10.

In the event that the field is placed out of phase by 90° in the opposite direction, an operation in the four quadrants can be obtained, that is, an acceleration or braking torque can be obtained in either of the machine's directions of rotation (clockwise or counterclockwise).

The proper combination of the number of teeth 1 of stator 10 with the number of teeth 21 of rotor 20 allows the achievement of torque and determination of the synchronous speed of the sub-synchronous reluctance electrical machine. As already said, the number of teeth of rotor 20 should differ from the number of teeth 1 of stator 10. By way of example, the practical construction illustrated on FIG. 1 shows a stator with 144 teeth and a rotor with 146 teeth.

The speed of rotor 20 is a function of the number of teeth of said rotor 20 and a function of the triggering frequency of the power source (not illustrated), that is, in a more specific manner, the speed of rotor 20 is directly proportional to the triggering speed of the power source and inversely proportional to the number of teeth 21 of rotor 20. Accordingly, it can be concluded that with a proper selection of the number of teeth 21 of rotor 20 it is easy to obtain any rated rotation or speed, with the variation of the power source switching frequency further allowing the achievement any rotation or speed, from zero to the rated value.

Even though some constructive models for the sub-synchronous electrical machine have been described and illustrated, it should be emphasized that the inventive concept can be applied to any type of configuration or employ any type of power source for the winding 6 of stator 10.

In particular, said power source (not illustrated) should have as a feature thereof the possibility of being directly or indirectly controlled by the monitoring device 4, thereby to feed the windings 6 of sectors 11, according to the relative position between stator 10 and rotor 20.

In respect of the monitoring device 4, in addition to the preferred types described above, use could be made of any device capable of accurately determining the relative position between stator 10 and rotor 20, and that may control a power source for the windings 6, either directly or through an interface.

On the other hand, the internal position adopted for the winding 6 can also be modified, such as, for example, by arranging the winding or windings 6 around the teeth 1 of stator 10. Another alternative is arranging the winding 6 around each of the sectors 11, thereby completely surrounding each said sector 11. In addition, each sector may comprise more than one winding 6, each fed separately by a respective power source.

What is claimed is:

1. A sub-synchronous reluctance electrical motor comprising at least one rotor formed of ferromagnetic plates and having a first plurality of uniformly distributed teeth and at least one stator including a second plurality of uniformly distributed teeth on said stator, said first plurality differing in number from said second plurality, wherein said stator comprises a plurality of sectors formed of ferromagnetic plates wherein said plates forming a sector are spaced from and non-touching the plates of the other sectors, each sector comprising at least one winding, and further comprising a monitoring device for tracking the relative position of said rotor with respect to said at least one stator, said monitoring device for sequentially energizing, via a current power source, in the direction opposite to the direction of movement of said rotor, said windings in contiguous said sectors so as to sequentially maintain energized two adjacent said sectors.

2. The motor in accordance with claim 1, wherein each said sector includes a groove, and said windings are respectively arranged in said groove.

3. The motor in accordance with claim 1, wherein said monitoring device is a Hall-effect detector.

4. The motor in accordance with claim 3, wherein said monitoring device is alternately an encoder and a resolver.

5. The motor in accordance with claim 1, wherein said motor is a sub-synchronous reluctance rotating motor.

6. The motor in accordance with claim 1, wherein said motor is a sub-synchronous reluctance linear motor.

7. The motor in accordance with claim 1, wherein said motor is a sub-synchronous reluctance disc motor.

8. The motor in accordance with claim 1, wherein said motor comprises at least two stators wherein each sector of said at least two stators comprises at least one winding.

* * * * *